US012618484B2

(12) United States Patent
Hudson et al.

(10) Patent No.: US 12,618,484 B2
(45) Date of Patent: May 5, 2026

(54) SEAL SHEET FOR ROTARY VALVE

(71) Applicant: Artisan Industries Inc., Stoughton, MA (US)

(72) Inventors: David A. Hudson, Stoughton, MA (US); Austin Sady, Wilbraham, MA (US); Peter J. Tavilla, Rochester, MA (US); Thomas Gibbons, N. Attleboro, MA (US); Ute Meissner, Medfield (UA)

(73) Assignee: Artisan Industries Inc., Stoughton, MA (US)

( * ) Notice: Subject to any disclaimer, the term of this patent is extended or adjusted under 35 U.S.C. 154(b) by 51 days.

(21) Appl. No.: 18/887,959

(22) Filed: Sep. 17, 2024

(65) Prior Publication Data

US 2026/0078830 A1     Mar. 19, 2026

(51) Int. Cl.
F16K 11/07 (2006.01)
F16K 11/074 (2006.01)
F16K 25/00 (2006.01)

(52) U.S. Cl.
CPC .......... F16K 11/074 (2013.01); F16K 25/005 (2013.01)

(58) Field of Classification Search
CPC .. F16K 11/074; F16K 25/005; B01D 53/0446
See application file for complete search history.

(56) References Cited

U.S. PATENT DOCUMENTS

| | | | | |
|---|---|---|---|---|
| 6,932,112 B2 * | 8/2005 | Bradford, III | ........ | F16K 11/074 137/554 |
| 8,695,633 B2 * | 4/2014 | Nowak | ................. | F16K 31/043 251/192 |
| 8,753,430 B2 * | 6/2014 | Koski | ................ | B01D 53/0446 95/143 |
| 11,808,372 B1 * | 11/2023 | Grissom | ............... | F16K 11/074 |
| 2010/0089241 A1 * | 4/2010 | Stoner | ................. | F16J 15/3448 264/261 |
| 2012/0285321 A1 * | 11/2012 | Koski | ................ | B01D 53/0446 95/143 |
| 2023/0003316 A1 * | 1/2023 | Hudson | ................. | F16K 11/074 |

* cited by examiner

*Primary Examiner* — P. Macade Nichols
(74) *Attorney, Agent, or Firm* — George Jakobsche Patent Counsel PLLC

(57) ABSTRACT

A rotary valve includes a rotor plate, a track plate, and a seal sheet, all housed within a pressure dome. The seal sheet includes little or no polytetrafluoroethylene (PTFE). Is some embodiments, the seal sheet includes about 35-60% bronze. In some embodiments, the rotor plate and/or the track plate include at least one fairing to improve fluid flow performance and reduce likelihood of cavitation.

16 Claims, 17 Drawing Sheets

116

112

134

304

124

130

132

122

128

110

102

106

112

124

700 702 704 706 708 710

| Toluene | Baseline | Modified, Iteration II | | Optimized (Revised Mesh) | |
|---|---|---|---|---|---|
| Max Velocity (ft/sec) | 94.20 | 57.90 | -39% | 78.30 | -17% |
| Lowest Cavitation Number | 1.30 | 6.10 | 369% | 2.75 | 112% |
| Cavitation Index | 5.90 | 19.80 | 236% | 12.50 | 112% |
| Total Pressure Drop (psi) | 21.86 | 6.45 | -70% | 10.33 | -53% |

SEAL SHEET FOR ROTARY VALVE

BACKGROUND

Technical Field

The invention relates to rotary valves, and more particularly to environmentally friendly seal sheets for rotary valves, and fairings for decreasing utility consumption and/or increasing flow capacity in rotary valves.

Related Art

A multi-position rotary valve (also sometimes referred to as a domed rotary valve) is a large, multi-way valve, a portion of which rotates (indexes) intermittently among a number of discrete positions to control fluid flow, such as in a petrochemical refinery or food processing plant. A rotary valve acts as a multi-way switch among a plurality of pipes terminating at the rotary valve. The rotary valve selectively directs fluid arriving at one of the pipes to another of the pipes, depending on rotational position of a rotor plate within the rotary valve.

The rotor plate defines a plurality of apertures through it. Pairs of these apertures are connected together via respective cross-over pipes. The rotor plate counterfaces, and is in fluid-tight contact with, a stationary track plate. The track plate also defines a plurality of apertures through it, and the pipes that terminate at the track plate are fluidically coupled to the track plate apertures. Thus, fluid can flow from a pipe, through a respective track plate aperture, and through a rotor plate aperture that registers with the track plate aperture. Track plate apertures that do not register with any rotor plate aperture are blocked by the rotor plate. A pressurized dome is attached to the track plate. Thus, the rotor plate is disposed inside a volume defined by the dome and the track plate.

In many embodiments, the rotor plate is on the order of 2 to 10 feet (0.6 to 3 m) in diameter and about 0.5 inch to 6 inches (12.7 to 152 mm) thick and is made primarily of carbon steel or stainless steel. Weight of the rotor plate contributes to a fluid tight coupling between the rotor plate and the track plate. Frequently, the dome is pressurized to further press the rotor plate against the track plate to increase the fluid tightness of this coupling.

A plastic seal sheet is often disposed between the rotor plate and the track plate to improve the fluid tightness of the coupling and to decrease friction between the rotor and track plates. In many cases, the plastic seal sheet includes polytetrafluoroethylene (PTFE). However, PTFE is now generally disfavored, because of its negative environmental impact due to per- and polyfluoroalkyl substances (PFAS) found in PTFE.

SUMMARY OF EMBODIMENTS

An embodiment of the present invention provides a multi-position rotary valve for selectively fluidically interconnecting subsets of pipes terminating at the rotary valve. The rotary valve includes a track plate, a pressure-tight housing, a rotor plate, a seal sheet, and at least one cross-over pipe. The track plate defines a plurality of apertures therethrough. One side of each aperture is configured to be fluidically connected to a respective one of the pipes. The pressure-tight housing is attached to the track plate to define a volume therebetween. The rotor plate is disposed in the volume. The rotor plate counterfaces the track plate. The rotor plate defines a plurality of apertures therethrough. The rotor plate is configured to rotate about an axis. At respective rotational positions, respective sets of the apertures through the rotor plate fluidically align with respective sets of the apertures through the track plate.

The seal sheet is disposed between the track plate and the rotor plate. The seal sheet is configured to maintain fluid-tight contact therebetween. The seal sheet includes about 35-60% bronze. At least one cross-over pipe is disposed within the volume and is attached to the rotor plate for rotation therewith. Each end of each of the at least one cross-over pipe is fluidically connected to one side of a respective aperture through the rotor plate.

Optionally, in any embodiment, the seal sheet includes about 1-10% molybdenum disulfide.

Optionally, in any embodiment, the seal sheet includes polytetrafluoroethylene.

Optionally, in any embodiment, the seal sheet is devoid of polytetrafluoroethylene.

Optionally, in any embodiment, the seal sheet is bonded to the track plate or to the rotor plate by an adhesive.

Optionally, any embodiment includes at least one retaining ring. In such an embodiment, each retaining ring is parallel and attached to the track plate or to the rotor plate. In such an embodiment, the seal sheet is disposed between the retaining ring and the track plate or the rotor plate, as the case may be.

Optionally, in any embodiment that includes at least one retaining ring, the rotor plate or the track plate that is attached to the at least one retaining ring, as the case may be, defines a plurality of radial grooves in a surface thereof that is in intimate contact with the seal sheet.

Optionally, in any embodiment, a surface of the track plate that counterfaces the rotor plate includes a coating and/or a region modified by a surface treatment. The surface has a lower coefficient of friction and/or a greater hardness than a hypothetical uncoated or untreated surface.

Optionally, any embodiment includes a plurality of fairings attached to the rotor plate. In such an embodiment, each fairing is disposed adjacent one aperture of the plurality of apertures defined through the rotor plate. Each such fairing is configured to improve fluid flow performance through the one aperture.

Optionally, in any embodiment that includes a plurality of fairings, each fairing of the plurality of fairings is removably attached to the rotor plate via a respective dovetail joint.

Optionally, in any embodiment that includes a plurality of fairings, each fairing of the plurality of fairings is permanently attached to, or integral with, the rotor plate.

Optionally, any embodiment that includes a plurality of fairings includes at least one retaining ring. In such an embodiment, each retaining ring is parallel and attached to the track plate, with the seal sheet disposed between the retaining ring and the track plate. Each such fairing of the plurality of fairings is permanently attached to, or integral with, a respective one of the at least one retaining ring.

Optionally, any embodiment includes a plurality of fairings attached to the track plate. In such an embodiment, each fairing is disposed adjacent one aperture of the plurality of apertures defined through the track plate. Each such fairing is configured to improve fluid flow performance through the one aperture.

Optionally, in any embodiment that includes a plurality of fairings, each fairing of the plurality of fairings is removably attached to the track plate via a respective dovetail joint.

Optionally, in any embodiment that includes a plurality of fairings, each fairing of the plurality of fairings is permanently attached to, or integral with, the track plate.

Optionally, any embodiment that includes a plurality of fairings includes at least one retaining ring. In such an embodiment, each retaining ring is parallel and attached to the rotor plate, with the seal sheet disposed between the retaining ring and the rotor plate. Each fairing of the plurality of fairings is permanently attached to, or integral with, a respective one of the at least one retaining ring.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments of the present invention provide rotary valves equipped with seal sheets that contain reduced amounts of PTFE, yet provide advantageous frictional and sealing characteristics. Some embodiments include fairings to improve fluid flow performance and reduce likelihood of cavitation.

Multi-Position Rotary Valve

Figure 1:
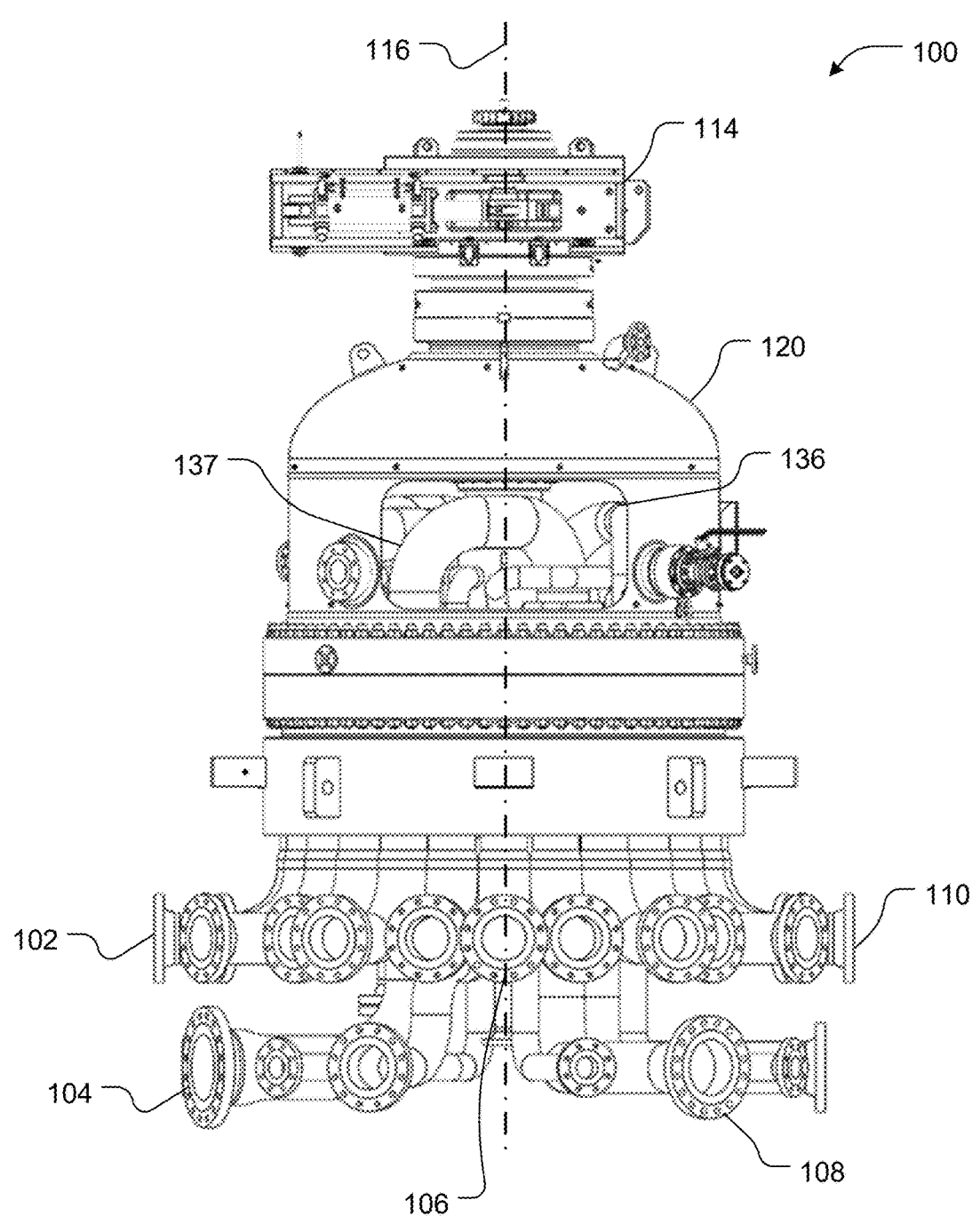
FIG. 1 is a partially cut-away illustration of an exemplary multi-position rotary valve, according to an embodiment of the present invention.
Figure 2:
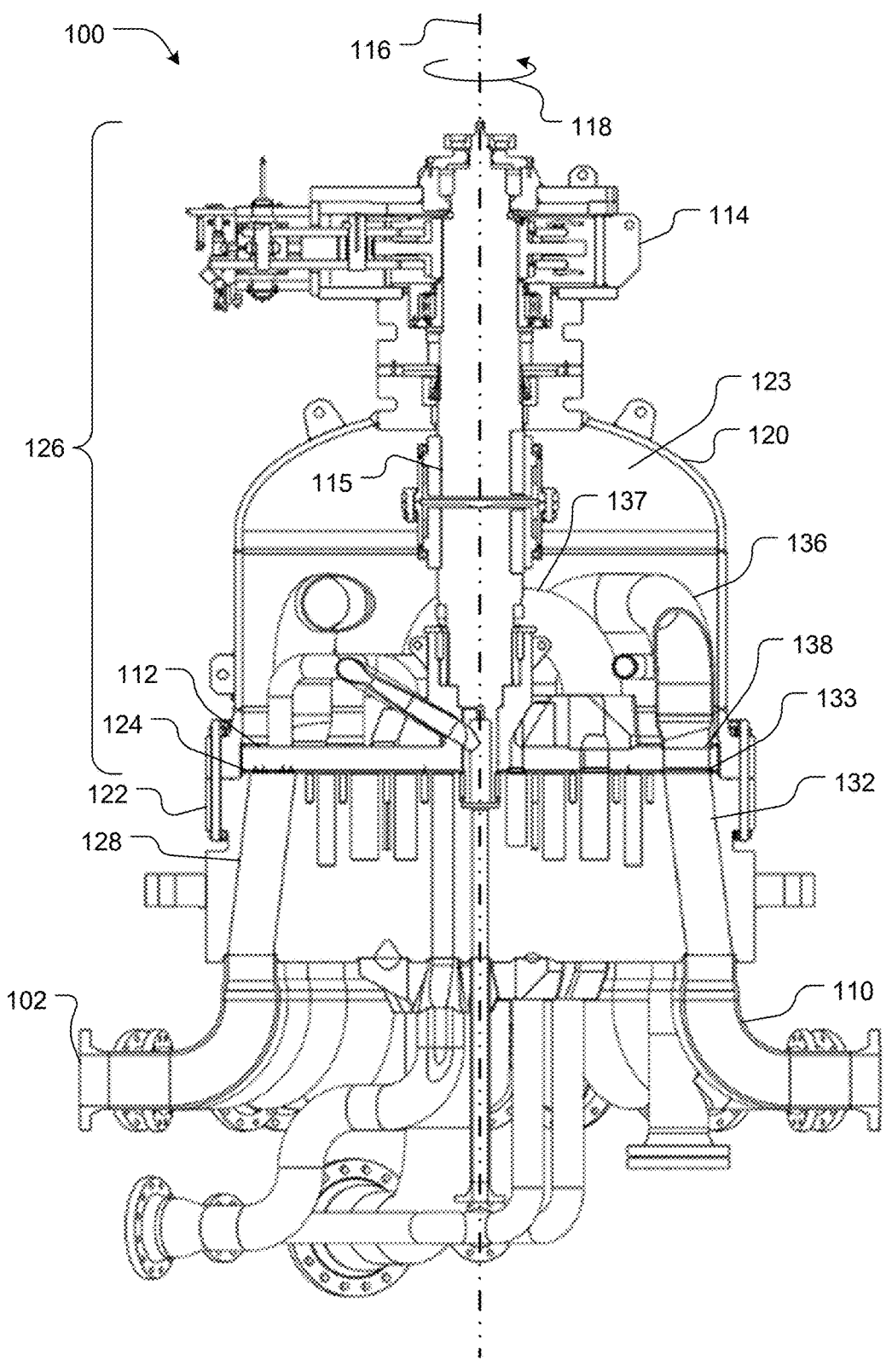
FIG. 2 is a vertical cross-section of the rotary valve of FIG. 1, according to an embodiment of the present invention.

FIG. 1 is a partially cut-away side view of an exemplary rotary valve 100. FIG. 2 is a vertical cross-section of the rotary valve 100. The rotary valve 100 acts as a large multi-way switch among a plurality of pipe couplings, exemplified by couplings 102, 104, 106, 108 and 110, terminating at the rotary valve 100. When installed, ends of pipes (not shown) from process equipment, such as tanks, distillers, wiped thin film evaporators, etc., are coupled to the rotary valve 100 via the couplings 102-110. The rotary valve 100 selectively fluidically interconnects pairs or other groups of the couplings 102-110 and, therefore, respective pairs or other groups of the pipes to the process equipment, to each other. In each rotary position, a different combination of the couplings 102-110, and therefore a different combination of the pipes, is fluidically coupled to each other, as described herein.

The rotary valve 100 selectively directs fluid arriving at one of the couplings 102-110 to one or more other of the couplings 102-110, depending on rotational position of a rotor plate 112 (FIG. 2) within the rotary valve 100. The rotor plate 112 may be rotated (indexed) by a driver 114, via a shaft 115, about an axis 116 to, in many embodiments, any of approximately two dozen discrete positions, thereby providing that number of different fluidic interconnections among the couplings 102-110. A direction of rotation is indicated by an arrow 118. Other embodiments have other numbers of rotational positions of the rotor plate 112. The driver 114 may include a gearbox, a ratchet driven by a hydraulic cylinder, an electromechanical cylinder or any other suitable mechanical motivator.

The rotary valve 100 includes an upper pressure-tight housing 120 detachably attached to a fixed track plate 122 (FIG. 2). Collectively, the housing 120 and the track plate 122 define a volume 123 therebetween. The rotor plate 112 is disposed in the volume 123, within the housing 120. The rotor plate 112 is parallel to, and in fluid-tight contact with, the track plate 122. The rotor plate 112 rotates, relative to the track plate 122, in a horizontal plane counterclockwise looking down on shaft 115, as indicated by the arrow 118, about the axis 116. However, in other embodiments, the rotor plate 112 rotates clockwise looking down on shaft 115.

The rotor plate 112 may be maintained in fluid-tight contact with the track plate 122 by a seal sheet 124 (FIG. 2) between the rotor plate 112 and the track plate 122. The seal sheet 124 is in intimate contact with the bottom surface of the rotor plate 112 and the top surface of the track plate 122. Weight of the rotor plate 112 as well as pressure in volume 123 urges the rotor plate 112, and therefore the seal sheet 124, against the track plate 122. The volume 123 of the housing 120 may be pressurized to increase the force of the rotor plate 112 against the seal sheet 124 and the track plate 122.

Figures 6, 7:
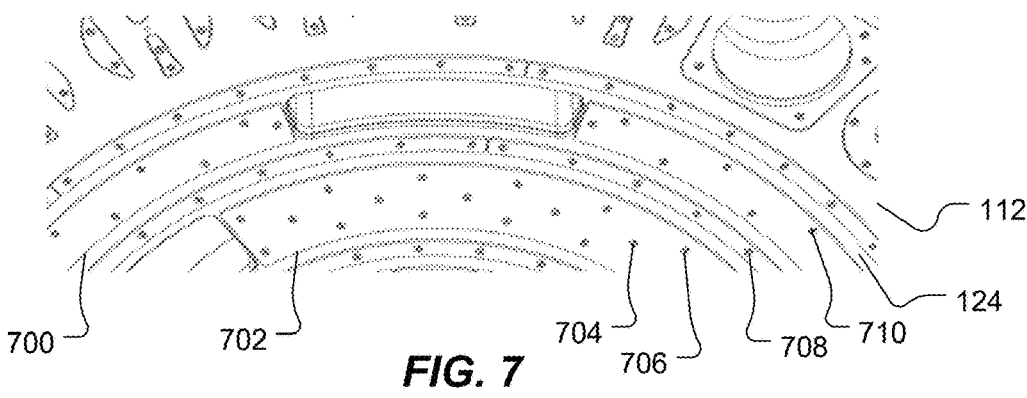
FIG. 6 is a perspective view of the bottom of the rotor plate of FIG. 5 atop a cut-away portion of the track plate of FIGS. 3 and 4, according to an embodiment of the present invention.
FIG. 7 is an enlarged view of a portion of the rotor plate of FIGS. 5 and 6, illustrating an aperture therethrough and a seal sheet and retaining rings, according to an embodiment of the present invention.

In some embodiments, the seal sheet 124 is attached to the bottom surface of the rotor plate 112, such as by a plurality of segmented washers and screws, as discussed herein with reference to FIG. 7. In other embodiments, the seal sheet 124 is attached to the top surface of the track plate 122, such as by a plurality of annular rings, washers and screws. As noted, the seal sheet 124 maintains a fluid-tight contact between the rotor plate 112 and the track plate 122. The seal sheet 124 also reduces friction between the rotor plate 112 and the track plate 122 as the rotor plate 112 indexes.

The rotor plate 112 rotates in a horizontal plane, about the axis 116. If an internal component, such as the seal sheet 124, becomes damaged or needs to be inspected, repaired or replaced, the housing 120 can be detached from the track plate 122, and a top head assembly 126 of the rotary valve 100 can be withdrawn from the track plate 122. However, disassembling the rotary valve 100 is time consuming and interferes with plant production.

For simplicity of explanation, it is assumed herein that the rotary valve 100 is oriented such that the rotor plate 112 axis 116 of rotation is vertical, the housing 120 is at the top of the rotary valve 100, and "top view" refers to a view down along or parallel to the rotor plate axis 116, toward the housing 120.

Figure 3:
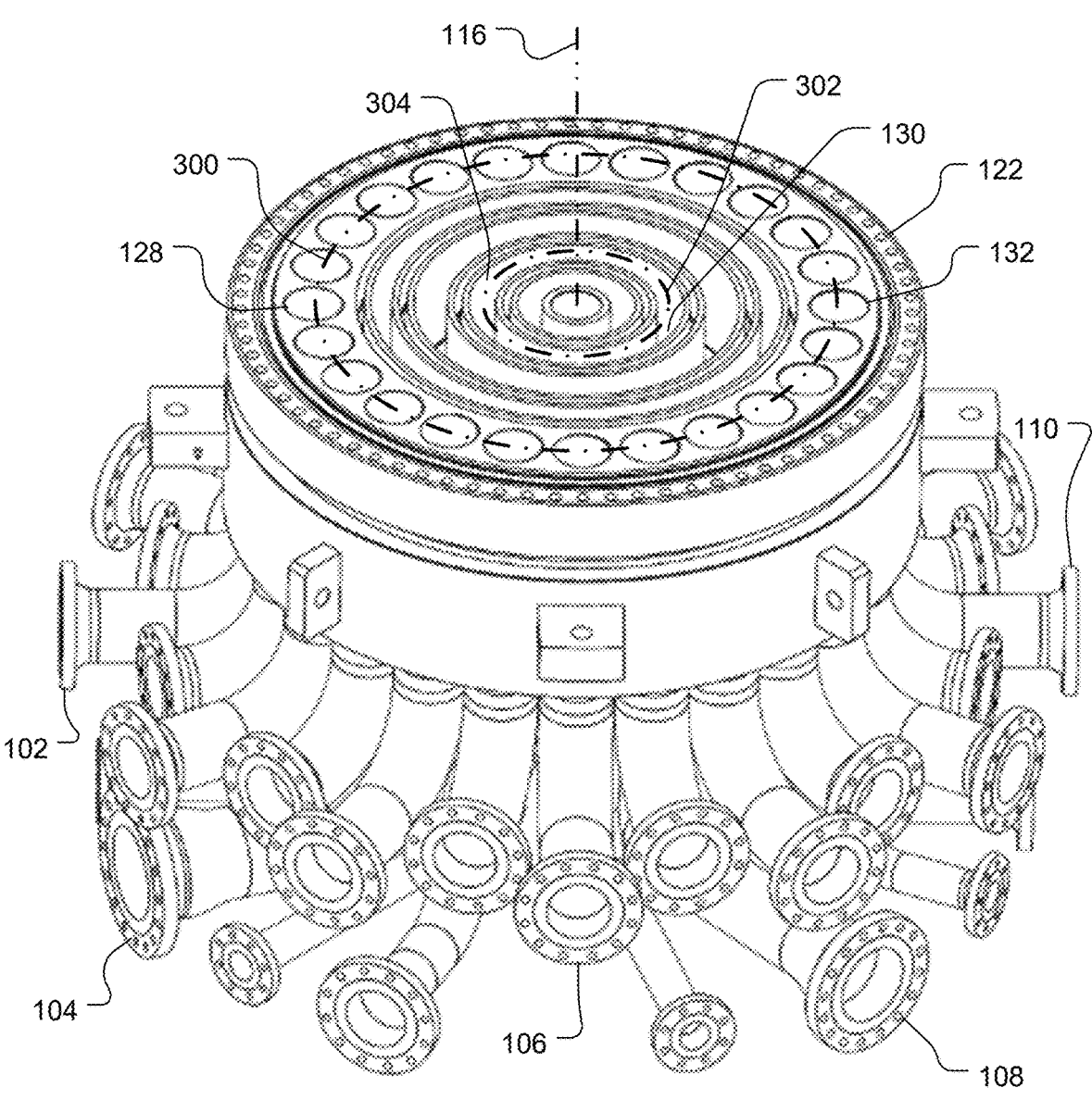
FIG. 3 is a perspective view of an exemplary track plate of the rotary valve of FIGS. 1 and 2, according to an embodiment of the present invention.
Figure 4:
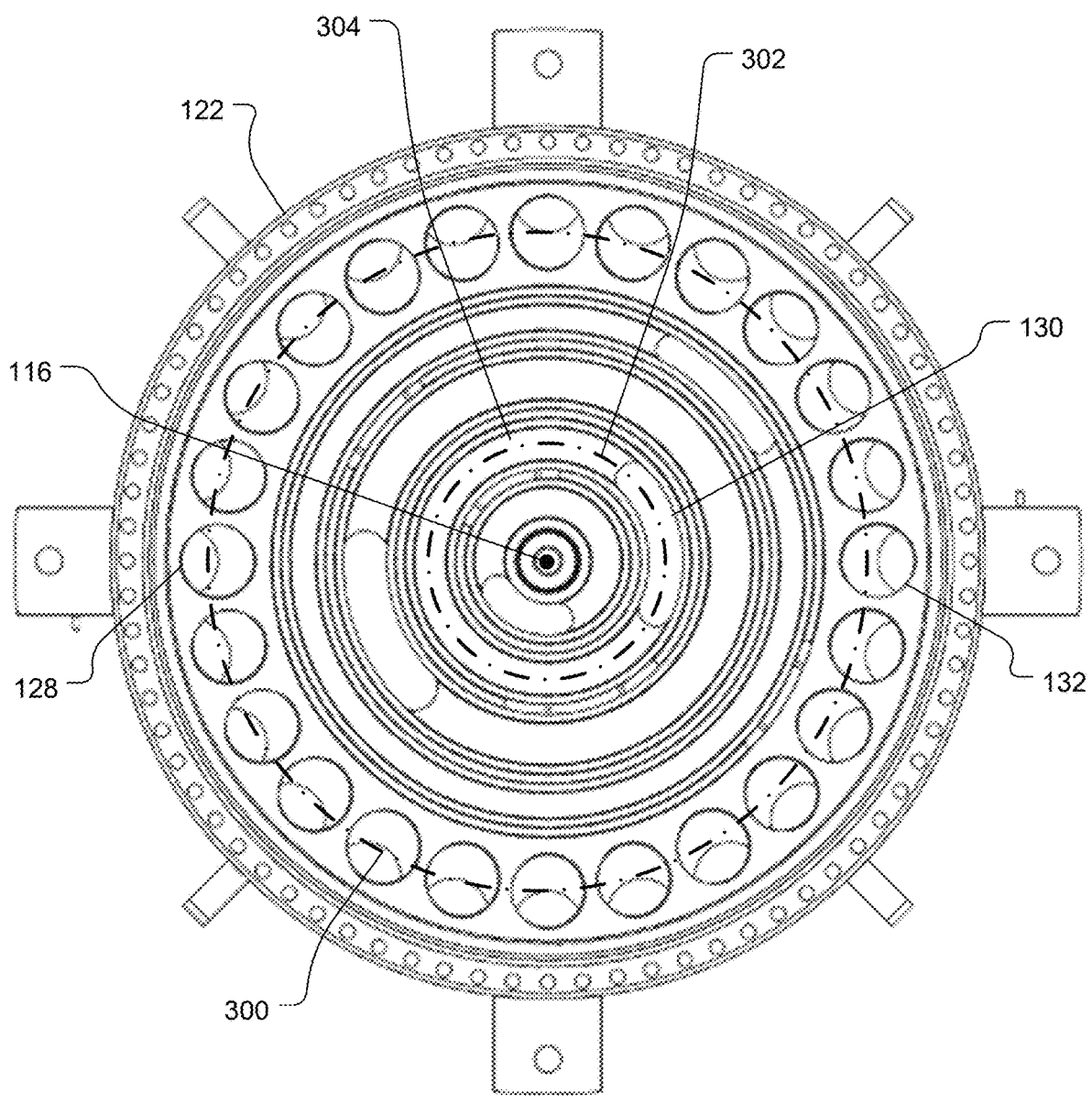
FIG. 4 is a top view of the exemplary track plate of FIG. 3, according to an embodiment of the present invention.
Figure 5:
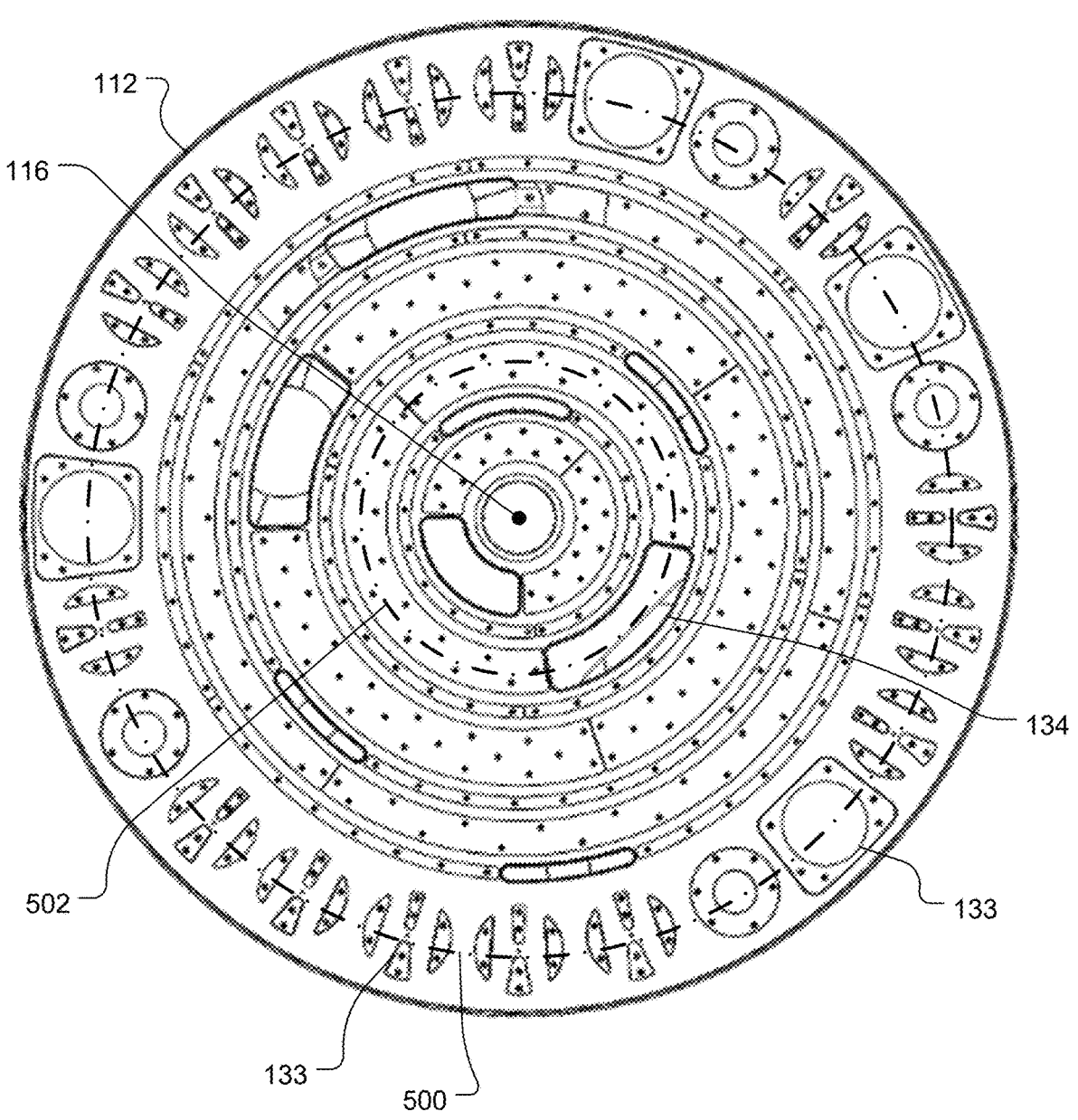
FIG. 5 is a bottom view of an exemplary rotor plate of the rotary valve of FIGS. 1 and 2, according to an embodiment of the present invention.

FIG. 3 is perspective view, and FIG. 4 is a top view, of an exemplary track plate 122. FIG. 5 is a bottom view of an exemplary rotor plate 112, and FIG. 6 is a perspective view of the bottom of the rotor plate 112 atop a cut-away portion of the track plate 122. FIG. 7 provides an enlarged view of a portion of the bottom of the rotor plate 112 of FIG. 6.

The track plate 122 (FIGS. 3, 4 and 6) defines a plurality of apertures therethrough, exemplified by apertures 128, 130 and 132. Respective apertures 128-132 are disposed along one or more imaginary circles, exemplified by circles 300 and 302 (indicated by dashed lines and best seen in FIGS. 3 and 4) centered on the axis 116. In the embodiment shown in FIGS. 3 and 4, the apertures 128 and 132 are centered on the imaginary circle 300. In FIGS. 3 and 4, the apertures 128 and 132 are circular in cross section, although in other embodiments, the apertures 128 and 132 can be other shapes and need not necessarily all be the same shape or size or all centered on the same imaginary circle. In FIGS. 3, 4, and 6, the aperture 130 includes an annular trench 304, centered on the imaginary circle 302. In some cases, some of the apertures in the track plate 122 include less than full circular sectors of annular trenches (not shown).

As best seen in FIGS. 2 and 6, a bottom side of each aperture 128-132 is fluidically connected to a respective one of the pipe couplings 102-110. For example, one end of coupling 102 is fluidically coupled to a bottom side of aperture 128, and one end of coupling 106 is fluidically coupled to a bottom side of the annular trench 304 of aperture 130. The couplings 102-110 may be attached to the track plate 122 by any suitable means, such as by respective welds.

As can be seen in FIG. 5, the rotor plate 112 also defines a plurality of apertures therethrough, exemplified by apertures 133 and 134. In a bottom view, some of the rotor plate 112 apertures, for example aperture 133, are positioned along imaginary circles, such as circle 500, along which the track plate 122 (FIG. 4) apertures 128 and 132 are defined. The rotor plate 112 can also define arcuate (annular sector) apertures, exemplified by the aperture 134. These arcuate apertures 134 are disposed along imaginary circles, exemplified by circle 502, which vertically align with center lines, exemplified by center line 302 (FIGS. 3 and 4), of the annular trenches, exemplified by annular trench 304, in the track plate 122. Therefore, at certain rotational positions of the rotor plate 112, some or all of the rotor plate apertures 133-134 vertically align with respective subsets of the track plate 122 apertures 128-132. At different rotational positions, the rotor plate 112 apertures 133-134 vertically align with different subsets of the track plate 122 apertures 128-132. Some of the rotor plate apertures, such as aperture 134, align with respective apertures, such as the trench of aperture 130, at all rotational positions of the rotor plate 112.

As shown in FIGS. 1 and 2, a cross-over pipe 136 is disposed within the volume 123 and is attached to the rotor plate 112 for rotation therewith. Each end (exemplified by end 138) of the cross-over pipe 136 is fluidically connected to an upper side of a respective aperture (exemplified by aperture 133) through the rotor plate 112.

The rotor plate 112 is configured to rotate about the axis 116 such that at respective rotational positions, respective sets of the apertures 133-134 through the rotor plate 112 align, i.e., vertically register, with respective sets of the apertures 128-132 through the track plate 122. For example, in the rotor plate 112 position shown in FIG. 2, the aperture 133 in the rotor plate 112 aligns with the aperture 132 in the track plate 122. The aperture 134 (FIG. 5) in the rotor plate 112 always aligns with the aperture 130 (FIG. 4) in the track plate 122, because the aperture 130 in the track plate 122 extends along an entire circle 302. Therefore, in the rotor plate 112 position shown in FIG. 2, the coupling 110 that terminates at the bottom of the aperture 132 in the track plate 122 is fluidically coupled, in sequence, via the apertures 132 and 133, the cross-over pipe 136, and additional apertures (not visible), to another coupling. In the rotor plate 112 position shown in FIG. 2, other couplings, for example coupling 102, are capped off by the rotor plate 112.

Some embodiments include multiple cross-over pipes, exemplified by cross-over pipe 137. In such embodiments, the rotor plate 112 defines additional apertures therethrough. Although a cross-over pipe 136 having two ends has been described, in other embodiments, a cross-over pipe may include three or more ends, each fluidically coupled to a respective aperture through the rotor plate 112. For example, a three-ended cross-over pipe may form an E-shaped manifold (not shown).

As noted, the weight of the rotor plate 112 and pressure within the dome 120 contribute to a fluid tight coupling between the rotor plate 112 and the track plate 122. However, this pressure also creates friction, which resists rotation of the rotor plate 112. The seal sheet 124 is generally designed to reduce this friction and provide a better fluid seal. Conventional seal sheets 124 include PTFE. A conventional seal sheet 124 consists of about 80% PTFE, about 15% glass, and about 5% molybdenum disulfide.

However, polytetrafluoroethylene (PTFE) belongs to a subgroup of per- and polyfluoroalkyl substances (PFAS) called fluorinated polymers, which is now environmentally disfavored. Reducing the amount of PTFE used in seal sheets reduces the amount of PFAS in the seal sheets and, therefore, environmental hazards and scope 3 emissions associated with rotary valves.

Environmentally Friendly and Long-Wearing Seal Sheet

Embodiments of the present invention reduce scope 3 emissions and provide superior wear characteristics by utilizing a seal sheet 124 that contains little or no PTFE. In these embodiments, the seal sheet 124 contains about 35-60% bronze, with the balance provided by a combination of PTFE, molybdenum, glass, and/or carbon fiber or other components. Some embodiments include about 5% molybdenum disulfide. Some embodiments contain about 40% PTFE, about 55% bronze, and about 5% molybdenum disulfide. We realized that a tradeoff exists between sealing ability and wear. Less bronze content results in a better seal, whereas more bronze results in better (longer) wear characteristics. A preferred embodiment includes about 55% bronze.

As noted, the seal sheet 124 may be attached to the track plate 122 or the rotor plate 112. The seal sheet 124 may be attached in any suitable manner. One suitable manner is illustrated in FIG. 7, in which the seal sheet 124 is attached to the rotor plate 112 by a set of retaining rings, exemplified by retaining rings 700 and 702. The retaining rings 700-702 are attached to the rotor plate 112 using any suitable fastener, such as threaded machine screws, exemplified by screws 704 and 706, driven through countersunk holes, exemplified by holes 708 and 710. When attached to the rotor plate 112, the retaining rings 700-702 sandwich the seal sheet 124 between themselves 700-702 and the rotor plate 112 to hold the seal sheet 124 fast against the rotor plate 112.

Figure 8:
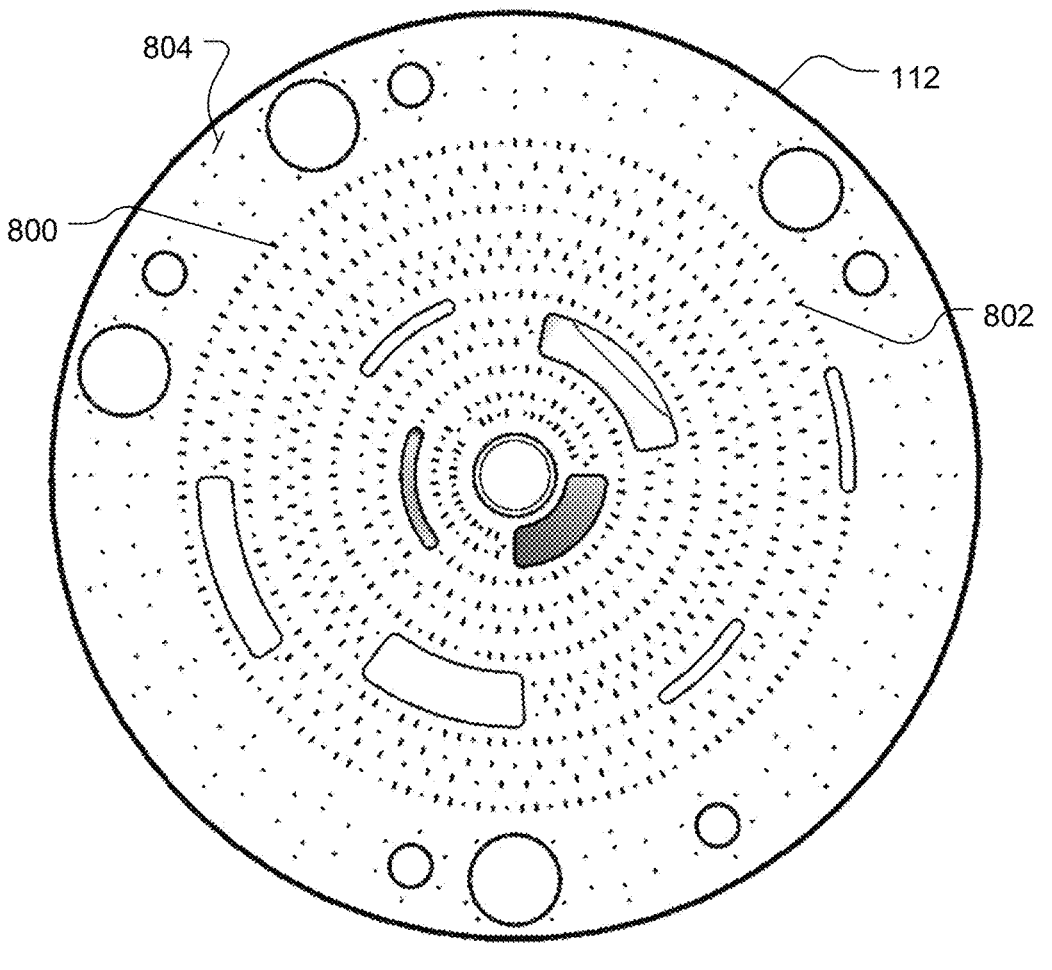
FIG. 8 illustrates the rotor plate of FIGS. 5, 6, and 7 with optional radial grooves defined in a surface, according to an embodiment of the present invention.
Figure 8:
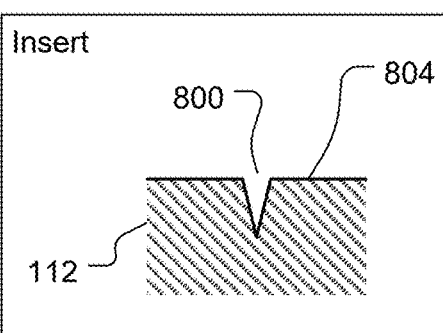

In some embodiments, the rotor plate 112 defines a plurality of radial groves in its surface that is in contact with the seal sheet 124. FIG. 8 illustrates an exemplary rotor plate 112 with grooves, exemplified by grooves 800 and 802, defined in its surface 804. The apertures 133-134 and the seal sheet 124 are omitted for clarity. An Insert in FIG. 8 provides a cross-sectional view of a typical groove 800, although the cross-sectional shape of the groove is not critical. The radial grooves 800-802 do not necessarily extend all the way from the inside to the outside of the rotor plate 112. Instead, they are preferably less than an inch (2.54 centimeters) long each, and only a fraction of an inch (one or a few millimeters) deep. The grooves 800-802 need not necessarily be regularly spaced, equally long, equally deep, or uniformly deep, but generally are. These grooves 800-802, together with smoothness of the surface 804, preferably Ra less than about 16, allow the seal sheet 124 to radially expand and flow into the grooves 800-802, to prevent the seal sheet 124 circumferentially rotating during indexing of the rotor plate 112.

Alternatively, the retaining rings 700-702 may be omitted, and the seal sheet 124 may be attached to the rotor plate 112 with a suitable adhesive.

Alternatively, the seal sheet 124 may be attached to the track plate 122 (not shown), such as by retaining rings or an adhesive. In such embodiments, the track plate 122 may define radial grooves, as described herein, with respect to the rotor plate 112.

Optionally or alternatively, the track plate 122 can be treated and/or have a coating applied to it to decrease friction and/or increase surface hardness. An exemplary surface coating is PTFE, which may, for example, be applied as a spray. The surface can be hardened through various methods, including: thermochemical diffusion methods, applied energy or thermal methods, and surface coating or surface-modification methods.

Thermochemical diffusion methods modify the chemical composition of the surface with hardening species, such as carbon, nitrogen, and boron. Diffusion methods allow effective hardening of the entire surface. They can be used for both single parts and batches. Applied energy or thermal methods do not modify the chemical composition of the surface. Instead, they improve properties by altering the surface structure, that is, they produce a quench-hardened surface, without additional alloying species. They can be used to harden the entire surface or only part of it (selective surface-hardening). Surface coating or surface-modification methods involve the intentional build-up of a new layer on the steel substrate.

Diffusion methods include: carburising, nitriding, nitrocarburising, carbonitriding, boriding or boronising, and thermal diffusion processes. Applied energy methods include: flame hardening, induction hardening, laser-beam hardening, and electron-beam hardening. Coating and surface modifications include: hard chromium plating, electroless nickel plating, thermal spraying, weld hardfacing, chemical vapor deposition, physical vapour deposition, lon implantation, and laser surface processing.

As a result of the coating and/or surface treatment, the surface of the track plate 122 that counterfaces the rotor plate 112 includes a coating and/or a region that was modified by the surface treatment. Consequently, the surface has a lower coefficient of friction and/or a greater hardness than a hypothetical uncoated or untreated track plate surface.

Fairings in a Rotary Valve

Fluid flow through a conventional rotary valve can lead to cavitation. Cavitation is a phenomenon in which a pressure change in a liquid leads to formation of small vapor-filled cavities in places where the local pressure of the fluid is reduced below the liquid's vapor pressure. Later, when subjected to a higher pressure, these cavities collapse and can generate shock waves. Collapsing cavities that implode near metal or flow boundary surfaces cause cyclic stress through repeated implosions. This results in damage to the surface and in some cases significant physical damage.

Such pressure changes frequently occur near bends in pipes and in other tortuous fluid channel paths, where sudden changes in direction of fluid flow occur, such as in rotary valves. Cavitation is a significant cause of component damage in some engineering contexts. Additional information about cavitation and structures to reduce cavitation is available in U.S. Pat. No. 11,592,041 titled "Device for Increasing Flow Capacity of a Fluid Channel," issued Feb. 28, 2023, the entire contents of which are hereby incorporated by reference herein, for all purposes.

As evident from FIGS. 3, 4, 5, and 6, fluid forced into one of the trenches, such as trench 304, from below the track plate 122, via one of the couplings 102-110, splits and travels in opposite directions around respective portions of the trench 304, until the fluid reaches an aperture, such as aperture 133 or 134, in the rotor plate 112 above the trench 304. The fluid then exits the trench 304 via the aperture 133 or 134.

Figure 9:
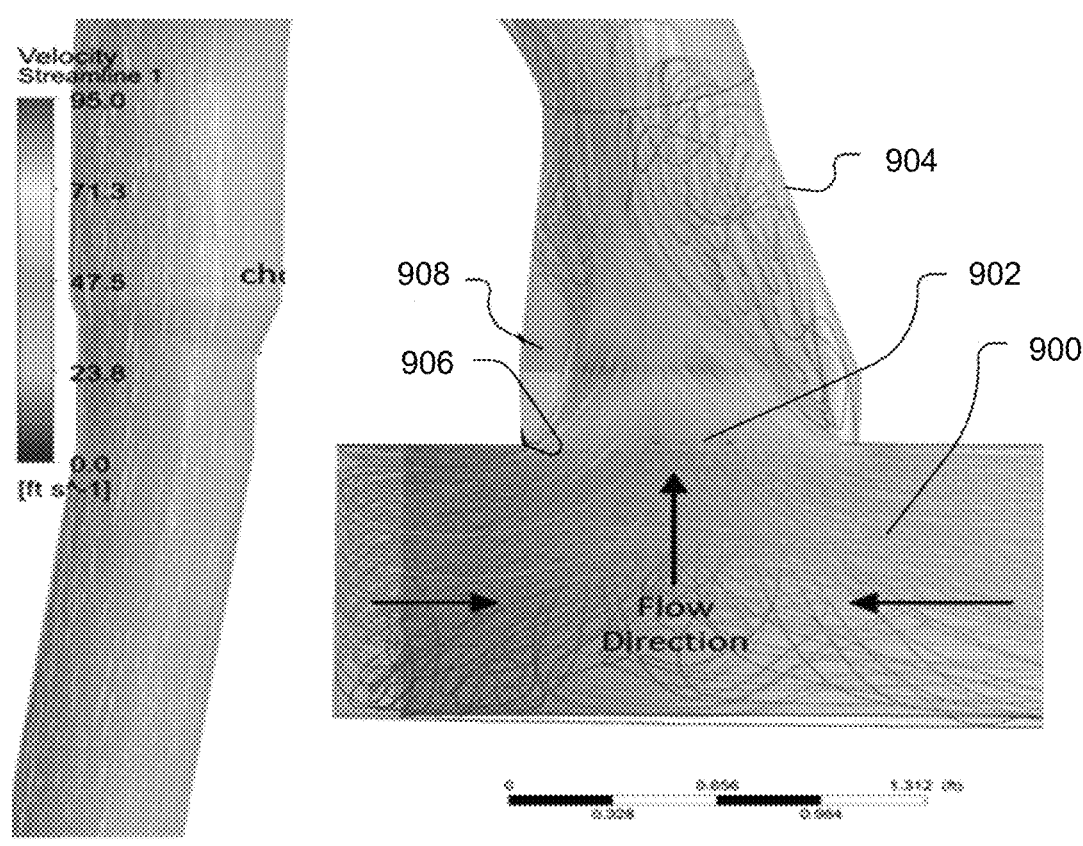
FIG. 9 is a computer-generated display of velocity color-coded streamlines from a computational fluid dynamic analysis of split path, high-velocity hydrocarbon fluid flow through a rotary valve, according to the prior art.

However, sharp corners of the aperture 304, 133, and/or 134 are discontinuities and, as discussed in U.S. Pat. No. 11,592,041, consequential sudden changes in direction of the fluid can lead to vena contracta, resulting in a pressure drops and flow separations from inner surfaces of the aperture 304, and/or 134. At high liquid velocity flows, the pressure drops and wall separations lead to cavitation and eventually to structural damage of the rotary valve. FIG. 9 is a computer-generated display of velocity color-coded streamlines from a computational fluid dynamic analysis of split path, high-velocity hydrocarbon fluid flow through a conventional rotary valve. FIG. 9 shows fluid flow from a trench 900, through a aperture 902, into a cross-over pipe 904. Note the discontinuity 906 and the area of choked flow 908.

Figures 10, 11:
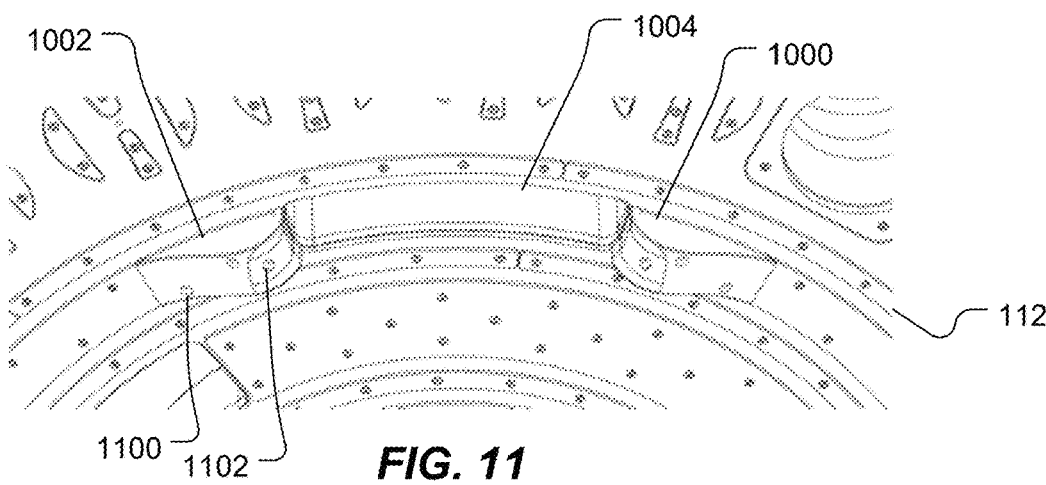
FIG. 10 is a cut-away view of a track plate, with a rotor plate on top of the track plate, similar to FIG. 6, except the rotor plate of FIG. 10 is equipped with first and second fairings at one aperture, according to an embodiment of the present invention.
FIG. 11 is an enlarged view of a portion of the rotor plate of FIG. 10, illustrating an aperture therethrough and two fairings, according to an embodiment of the present invention.

FIG. 10 is a cut-away view of a track plate 122, with a rotor plate 112 on top of the track plate 122, similar to FIG. 6, except the rotor plate 112 in FIG. 10 is equipped with first and second fairings 1000 and 1002 at one aperture 1004. FIG. 11 is an enlarged view of a portion of the rotor plate 112 of FIG. 10. Each of the first and second fairings 1000 and 1002 is similar to the fairings described in U.S. Pat. No. 11,592,041. Each of the first and second fairings 1000 and 1002 defines a respective fairing surface located entirely in a fluid channel. The fairing surface of each of the first and second fairings 1000 and 1002 is configured for fluid flow along the fairing surface. Each fairing surface extends from a respective leading edge of the fairing surface, located upstream of the discontinuity, to a respective trailing edge of the fairing surface located downstream of the leading edge, at least as far as the discontinuity. At each leading edge, the fairing surface is tangent the channel surface. At each trailing edge, the fairing surface is tangent the channel surface. Each fairing surface follows a respective curve that smoothly transitions between the leading edge and the trailing edge.

Figure 12:
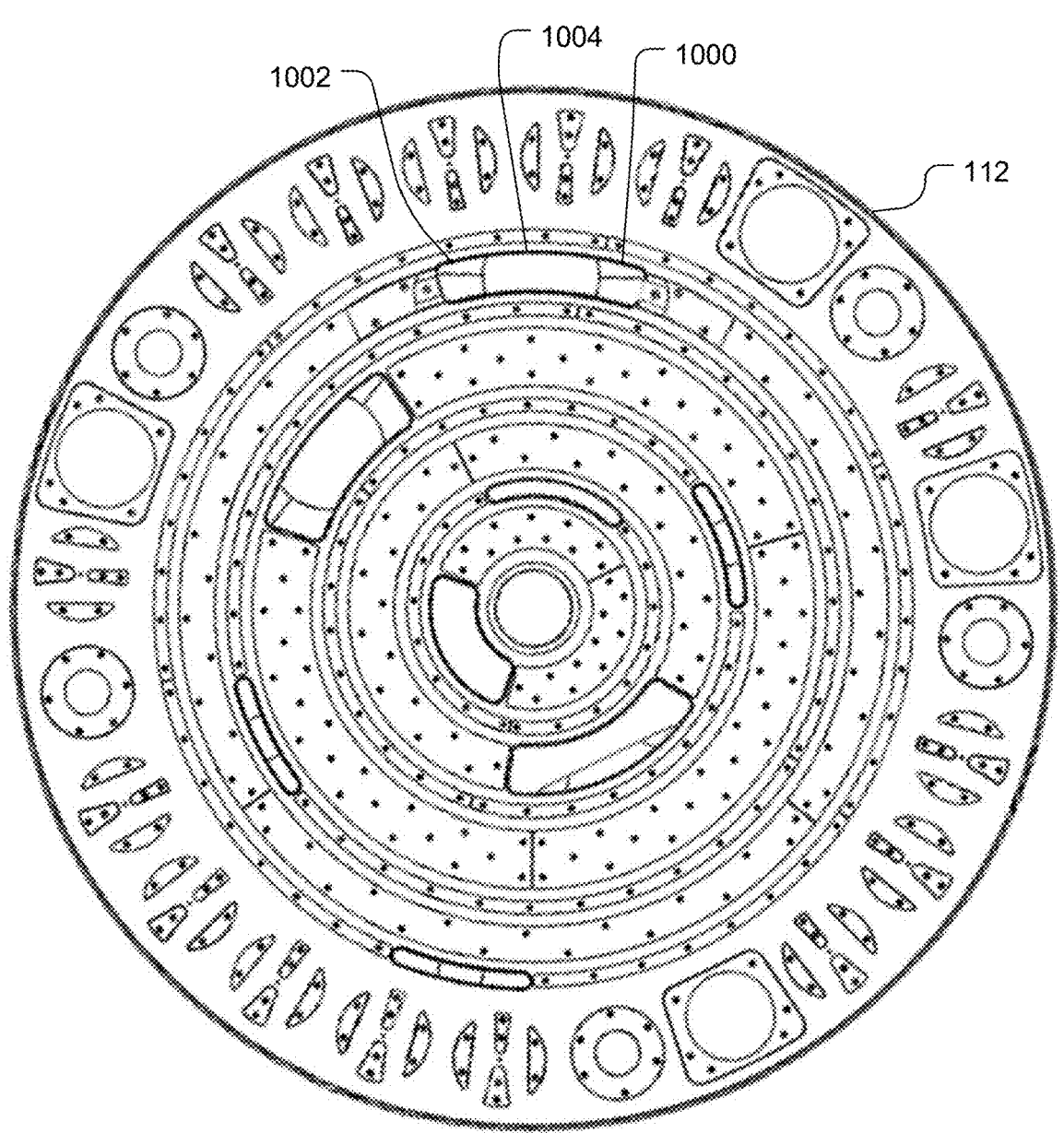
FIG. 12 is a bottom view of the rotor plate of FIGS. 10 and 11, according to an embodiment of the present invention.

FIG. 12 is a bottom view of the rotor plate 112. As shown, any number of the apertures of the rotor plate 112 may be equipped with fairings.

Figure 13:
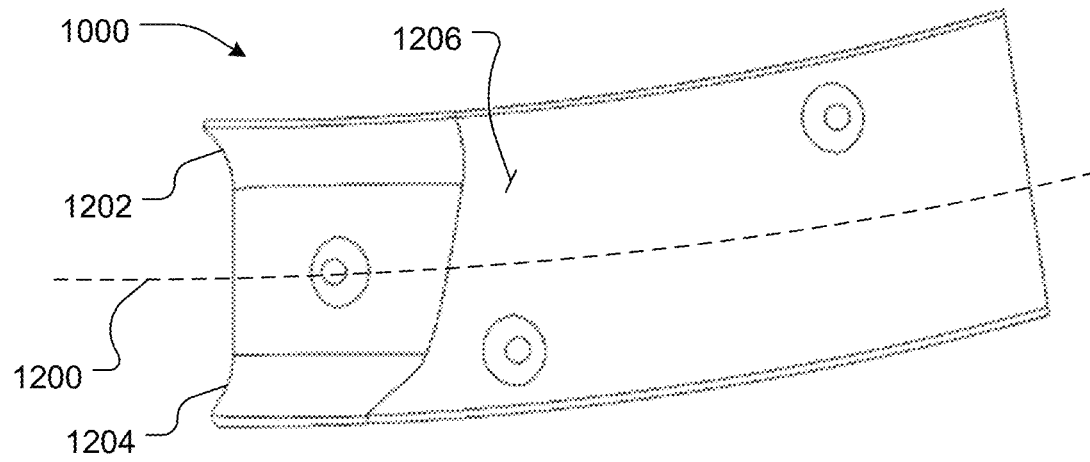
FIGS. 13, 14, and 15 are respective top, perspective, and side views of one of the fairings of FIGS. 10, 11, and 12, according to an embodiment of the present invention.
Figure 14:
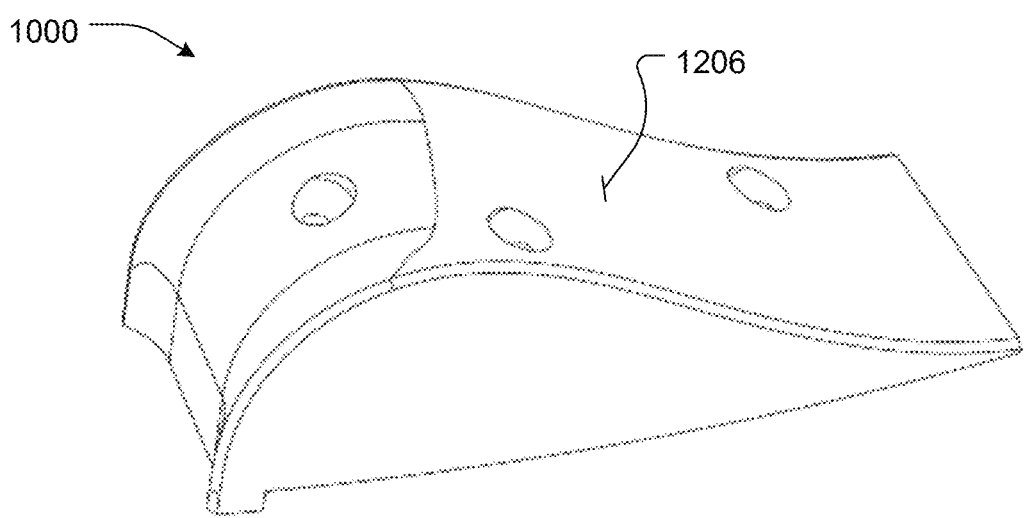
Figure 15:
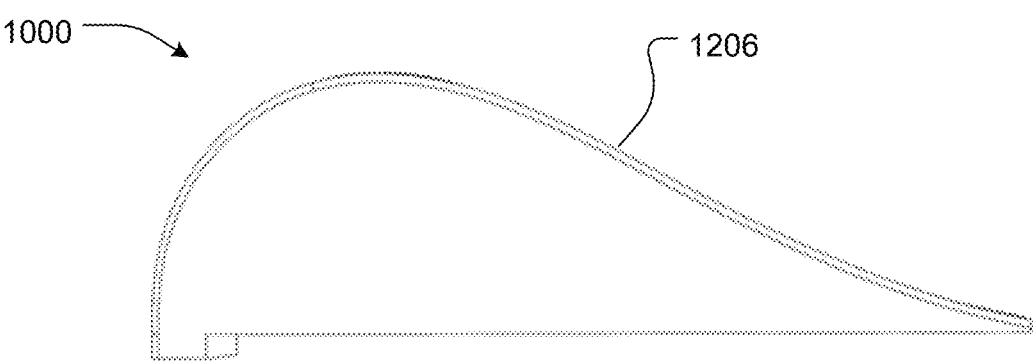

FIGS. 13, 14, and 15 are respective top, perspective, and side views of one of the fairings 1000. It should be noted that a lateral cross-section, i.e., a cross-section taken perpendicular to a longitudinal axis 1200, of the fairing 1000 need not necessarily be straight. For example, as best seen in FIG. 13 in areas 1202 and 1204, the lateral cross-section may be curved, depending on a desired flow profile. The fairing surface is indicated at 1206.

Figure 16:
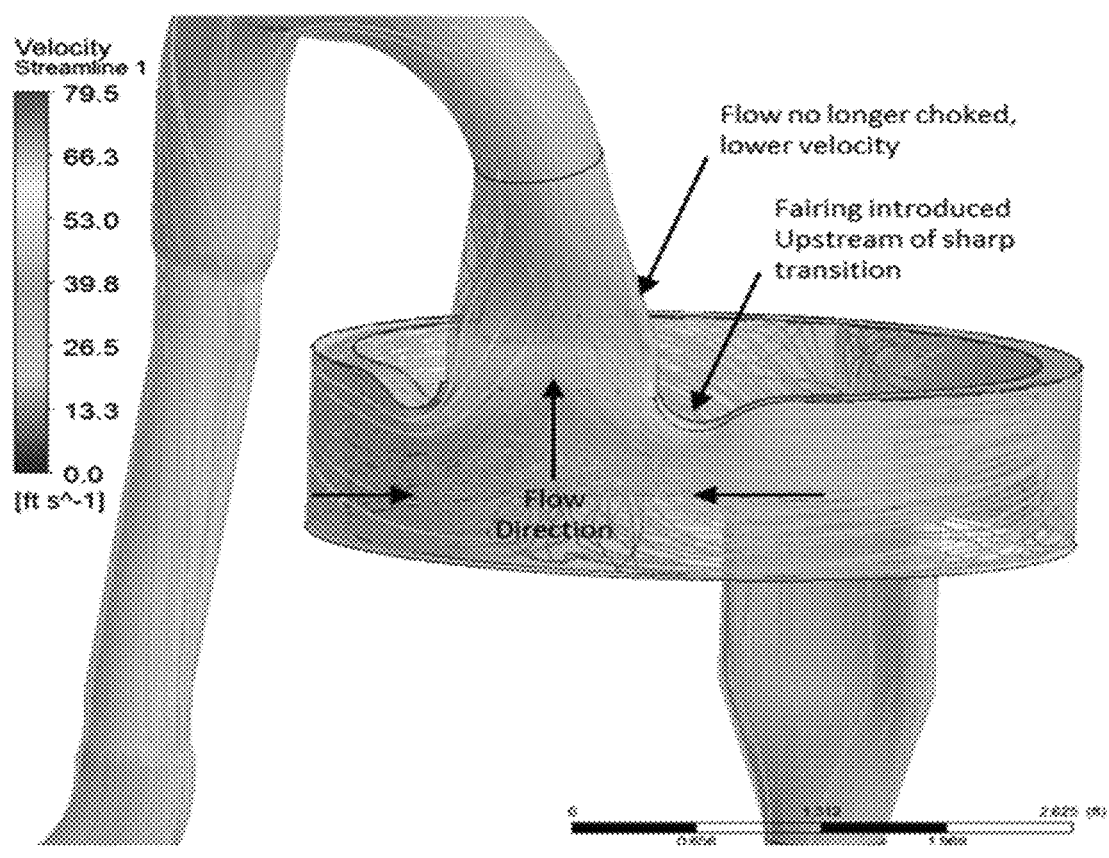
FIG. 16 is a computer-generated display of velocity color-coded streamlines, similar to FIG. 9, except with the fairings of FIGS. 10-15 installed, according to an embodiment of the present invention.

FIG. 16 is a computer-generated display of velocity color-coded streamlines, similar to FIG. 9, except with the fairings 1000-1002 installed. As can be seen by comparing FIGS. 9 and 16, the fairings 1000-1002 can reduce channel restrictions at discontinuities, thereby allowing higher fluid flow rates, without cavitation. In both cases, the flow field entering the valve is split at a transition region into a ring-shaped track before re-combining through a single exit. An analysis of the data of these figures shows that, in the presence of the fairings 1000-1002, pressure drop for a given flow rate is reduced approximately 50%, with corresponding benefits of peak velocity reduction and increased margin against cavitation.

Figure 17:
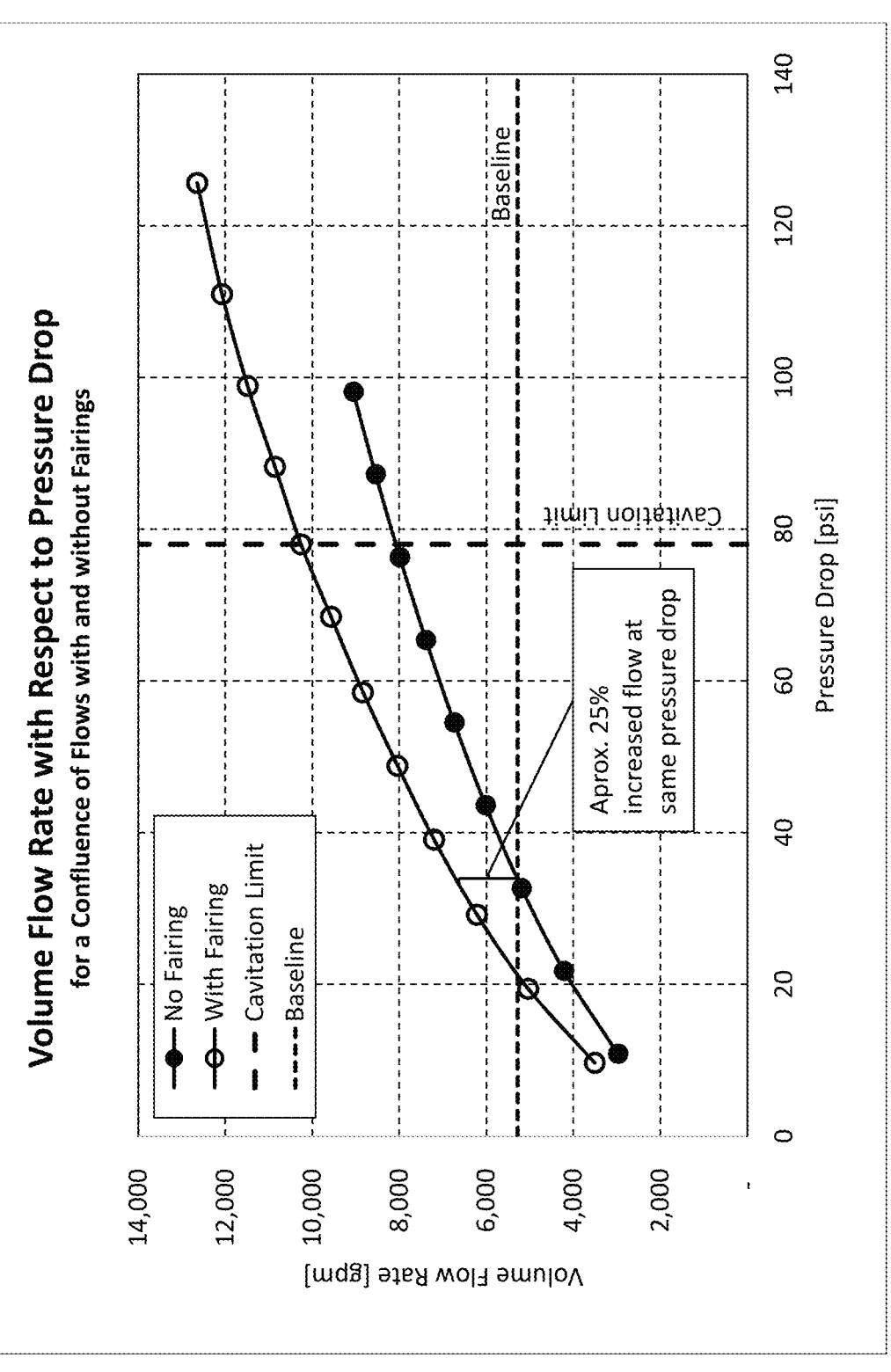
FIG. 17 is a graph characterizing volume flow rate with respect to pressure drop, in an exemplary application of the fairings of FIGS. 10-15, according to an embodiment of the present invention.

An analytical characterization of the flow rate, with respect to pressure drop, in rotary valve applications where hydrocarbons are pumped at high volumetric flowrates indicates that the referenced 50% reduction in pressure drop for a given flow rate could be re-equated to nearly 25% more volumetric flow, for the same pumping energy required (pressure drop), or a corresponding reduction in utility energy (typically electricity) consumption at the same volumetric flow rate. A typical characterization of this performance is shown in FIG. 17.

Figure 18:
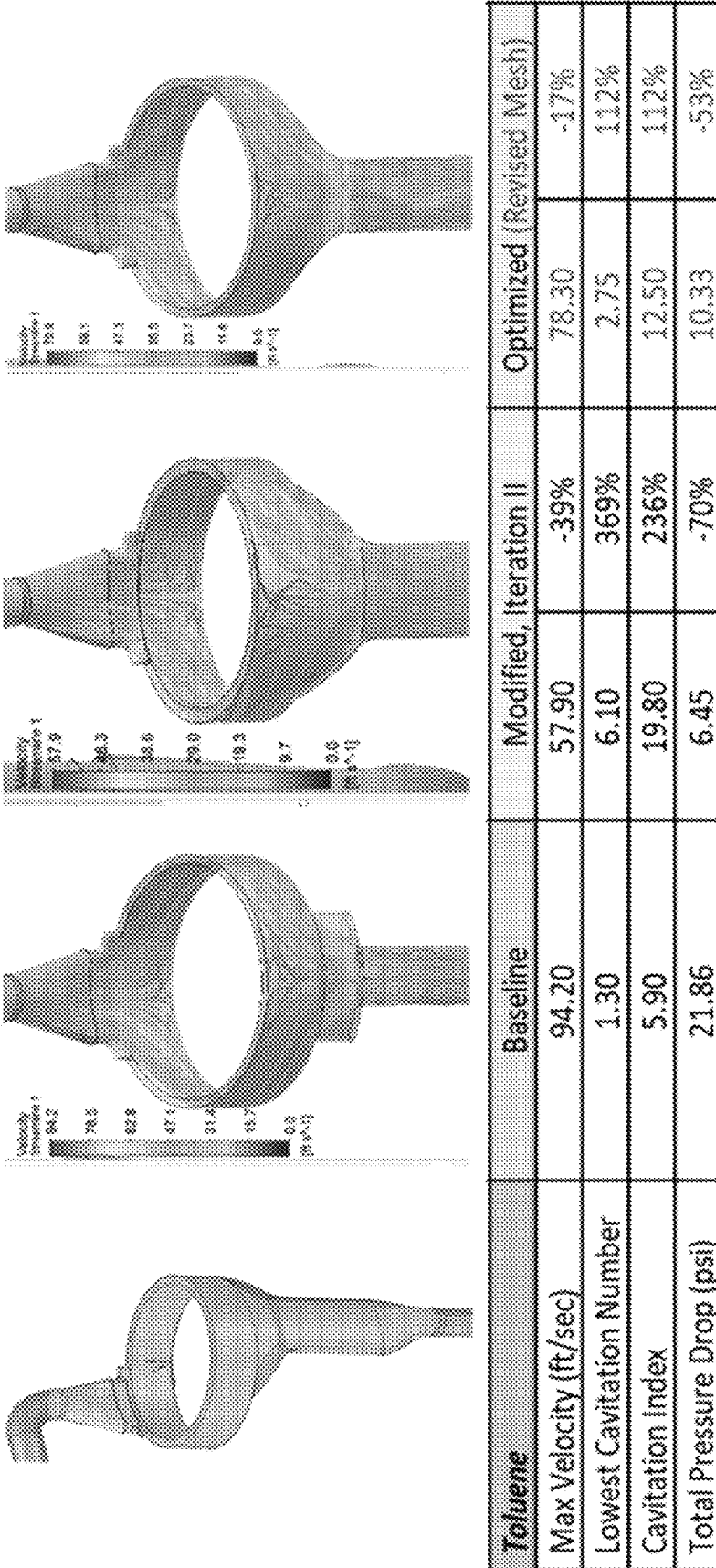
FIG. 18 summarizes applications and performance of some exemplary integral fairing designs, according to respective embodiments of the present invention.

FIG. 18 summarizes applications and performance of some exemplary integral fairing designs.

In the embodiment shown in FIGS. 10, 11, and 12, the fairings 1000 and 1002 are attached to the rotor plate 112 by screws, exemplified by screws 1100 and 1102 (best seen in FIG. 11). The fairings 1000 and 1002 can, but need not necessarily, be removably attached to the rotor plate 112 by the screws 1100-1102.

Optionally or alternatively, some or all of the fairings may be integral with the rotor plate 112 or with respective ones of the retaining rings 700-702. An integral fairing may be machined as part of the rotor plate 112 or retaining ring 700-702, or the fairing may be permanently attached, such as by welding it to the rotor plate 112 or retaining ring 700-702.

Figure 19:
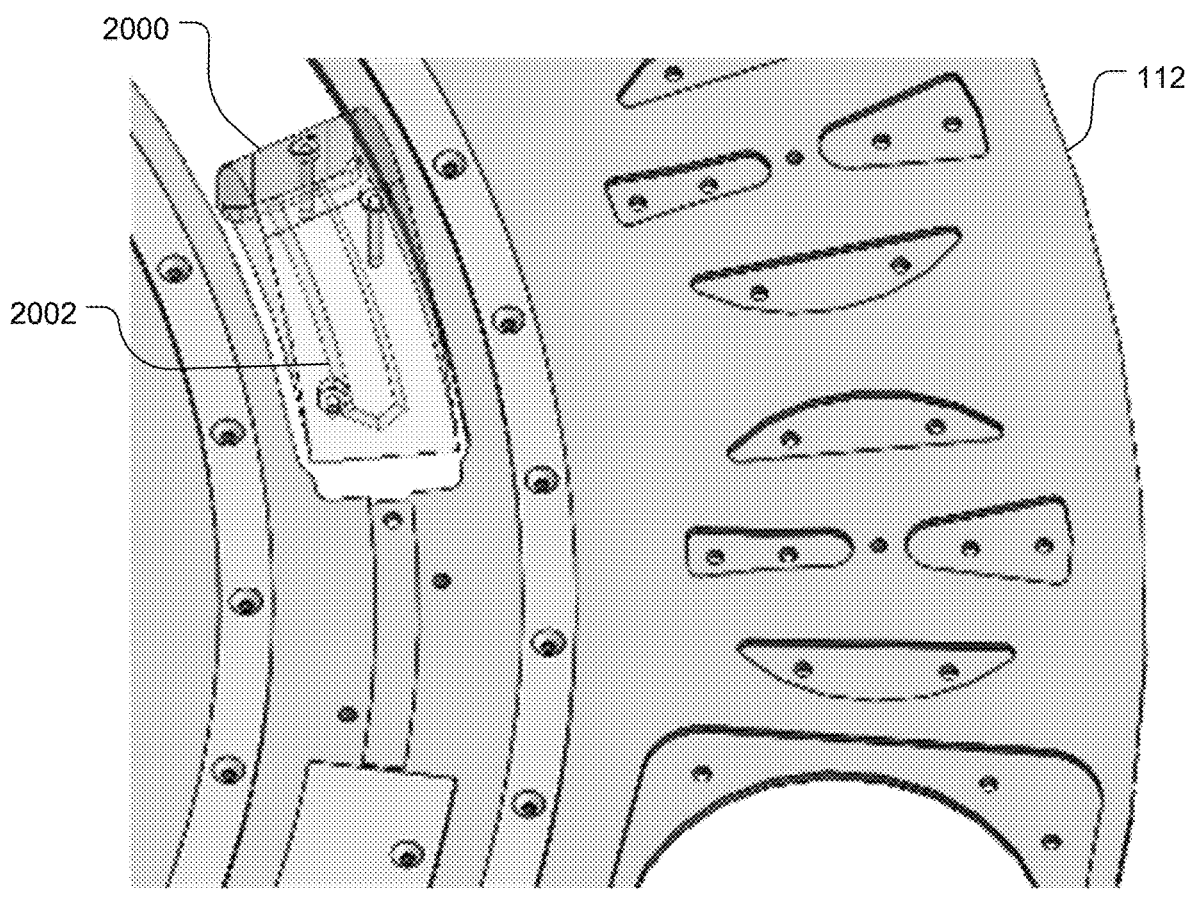
FIG. 19 is a top view of a rotor plate and a fairing with a male dovetail in position, ready to be inserted into a female dovetail defined by the rotor plate, according to an embodiment of the present invention.
Figure 20:
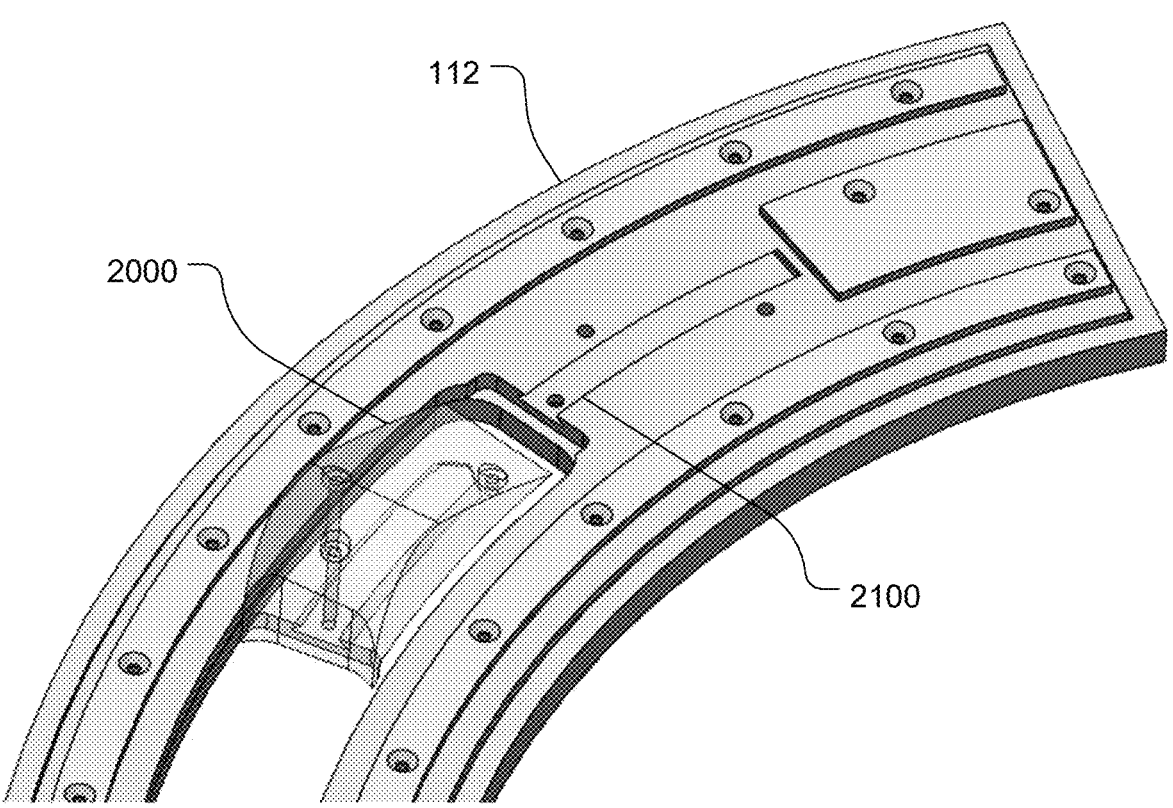
FIG. 20 is a bottom perspective view of the rotor plate of FIG. 19 with the fairing ready to be inserted into the female dovetail defined by the rotor plate, according to an embodiment of the present invention.

Any fairing can be attached to the rotor plate 112 via a dovetail joint, for example as illustrated in FIGS. 19 and 20. FIG. 19 is a top view of the rotor plate 112. A fairing 2000 with a male dovetail 2002 is shown in position, ready to be inserted into a female dovetail (not visible) defined by the rotor plate 112. FIG. 20 is a bottom perspective view of the rotor plate 112 with the fairing 2000 ready to be inserted into the female dovetail 2100 defined by the rotor plate 112. Once the fairing 2000 is inserted into the female dovetail 2100, the fairing may be secured to the rotor plate 112, such as by screws, as discussed herein. Dovetails, as described, enable secure attachment of fairings, yet enable the fairings to be removed for replacement or inspection.

If fairings are installed or attached to the rotor plate 112, the track plate 122 should define trenches sized and shaped to permit the fairings to travel in the trenches, as the rotor plate 112 rotates.

Figure 21:
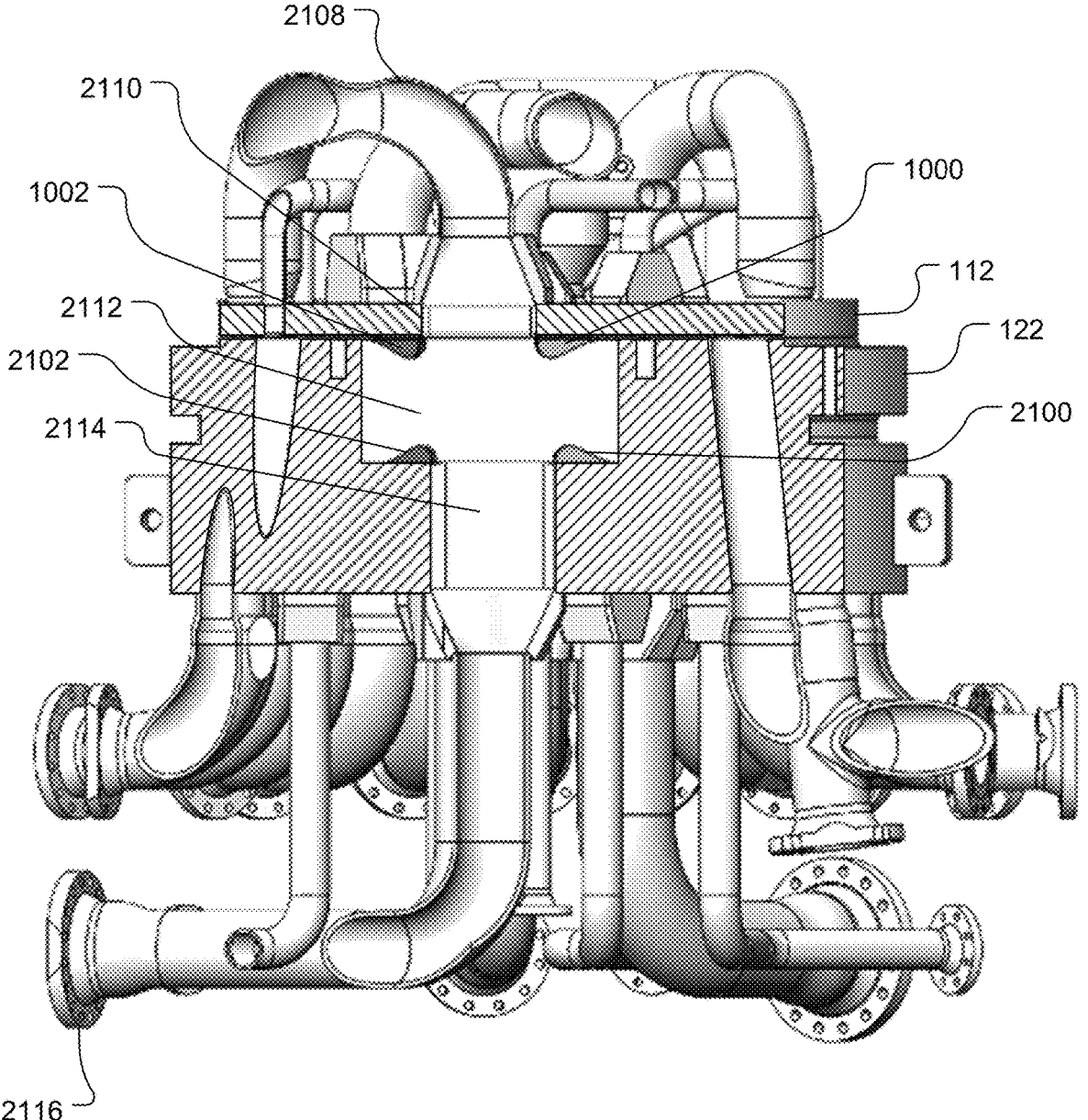
FIG. 21 is a cross-sectional view of a track plate and rotor plate, similar to FIG. 10, except the track plate of FIG. 21 is also equipped with two fairings, according to an embodiment of the present invention.

As described with respect to FIG. 10, a rotor plate 112 can be equipped with one or more fairings, exemplified by fairings 1000 and 1002, to prevent or reduce cavitation. As shown in FIG. 21, optionally or alternatively, fairings, exemplified by fairings 2100 and 2102 can be installed or attached to the track plate 122. Cross-over pipe 2108 is fluidically connected to aperture 2110 in the rotor plate 112. In the rotor plate 112 rotary position shown in FIG. 21, the aperture 2110 in the rotor plate 112 is aligned with aperture 2112 in the track plate 122. Assume the aperture 2112 is a circular trench in the track plate 122, as discussed with respect to FIG. 3, and a down-connection 2114 fluidically couples the aperture 2112 to a coupling 2116.

The fairings 2100 and 2102 prevent fluid flowing between the aperture 2112 and the down-connection 2114 experiencing sharp corners and, therefore, prevent or reduce cavitation.

Definitions

As used herein, the following term shall have the following meanings, unless context indicates otherwise.

"Pressure" means a force applied perpendicular to a surface of an object per unit area over which the force is distributed. A non-zero pressure that is less than an ambient pressure, or less than a pressure in a reference location such as a suction material input port, is referred to as a "partial vacuum," but is nonetheless considered to be a pressure. Partial vacuum is measured in units of pressure, typically as a subtraction relative to ambient atmospheric pressure on Earth or the pressure in the reference location. "Gauge pressure" is pressure relative to an ambient, usually atmospheric, pressure, and a negative gauge pressure indicates a partial vacuum.

Pressure or partial vacuum can be expressed using various units, such as millimeters of mercury absolute (mm HgA), Torr, pascal, inches of mercury, inches of water, pounds per square inch (psi) or kilograms per centimeter squared (kg/cm²). "Absolute vacuum" is a theoretical concept that characterizes a space completely devoid of matter. Partial vacuum measured relative to ambient, typically atmospheric, pressure is specified with a "V," as in millimeters of mercury vacuum (mm HgV), whereas partial vacuum measured relative to absolute vacuum is specified with an "A," as in millimeters of mercury absolute (mm HgA). As used herein, the term "vacuum" without modifier means partial vacuum.

"Continually" means continuously or repeatedly, although not necessarily in perpetuity. The term continually encompasses periodically and occasionally. Continually generating a signal means generating a continuously varying signal over time or generating a series of (more than one) discrete signals over time. Continually generating a value, such as an error value, means generating a continuously varying value, such as an analog value represented by a continuously varying voltage, or generating a series of (more than one) discrete values over time, such as a series of digital or analog values.

While the invention is described through the above-described exemplary embodiments, modifications to, and variations of, the illustrated embodiments may be made without departing from the inventive concepts disclosed herein. For example, although specific parameter values, such as materials and dimensions, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items or categories, means one or more of the items or categories in the list, i.e., at least one of the items or categories in the list, but not necessarily all the items in the list and not necessarily one item from each category in the list. As used herein, including in the claims, the term "or," used in connection with a list of items or categories, means one or more of the items or categories in the list, i.e., at least one of the items or categories in the list, but not necessarily all the items in the list and not necessarily one item from each category in the list. "Or" does not mean "exclusive or," and "or" does not mean "at least one from each (category)."

As used herein, including in the claims, the term "adjacent" means next to or adjoining. Adjacent refers to a nearest item or a nearest item in a direction being referenced.

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block or schematic diagrams, functions, operations, decisions, etc. of all or a portion of each block, or a combination of blocks, may be combined, separated into separate operations or performed in other orders.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective fairings or other components from one another and are not intended to indicate any particular order or total number of fairings or other items in any particular embodiment. Thus, for example, a given embodiment may include only a second fairing and a third fairing.

What is claimed is:

1. A multi-position rotary valve for selectively fluidically interconnecting subsets of pipes terminating at the rotary valve, the rotary valve comprising:
    a track plate that defines a plurality of apertures therethrough, one side of each aperture being configured to be fluidically connected to a respective one of the pipes;
    a pressure-tight housing attached to the track plate to define a volume therebetween;
    a rotor plate disposed in the volume, counterfacing the track plate, defining a plurality of apertures therethrough, and configured to rotate about an axis such, that at respective rotational positions, respective sets of the apertures through the rotor plate fluidically align with respective sets of the apertures through the track plate;
    a seal sheet disposed between the track plate and the rotor plate and configured to maintain fluid-tight contact therebetween, the seal sheet comprising about 35-60% bronze; and
    at least one cross-over pipe disposed within the volume and attached to the rotor plate for rotation therewith, each end of each of the at least one cross-over pipe being fluidically connected to one side of a respective aperture through the rotor plate.

2. A rotary valve according to claim 1, wherein the seal sheet comprises about 1-10% molybdenum disulfide.

3. A rotary valve according to claim 2, wherein the seal sheet comprises polytetrafluoroethylene.

4. A rotary valve according to claim 2, wherein the seal sheet is devoid of polytetrafluoroethylene.

5. A rotary valve according to claim 1, wherein the seal sheet is bonded to the track plate or to the rotor plate by an adhesive.

6. A rotary valve according to claim 1, further comprising at least one retaining ring, each retaining ring being parallel and attached to the track plate or to the rotor plate, with the seal sheet disposed between the retaining ring and the track plate or the rotor plate, as the case may be.

7. A rotary valve according to claim 6, wherein the rotor plate or the track plate attached to the at least one retaining ring, as the case may be, defines a plurality of radial grooves in a surface thereof that is in intimate contact with the seal sheet.

8. A rotary valve according to claim 1, wherein a surface of the track plate that counterfaces the rotor plate comprises a coating and/or a region modified by a surface treatment, such that the surface has a lower coefficient of friction and/or a greater hardness than a hypothetical uncoated or untreated surface.

9. A rotary valve according to claim 1, further comprising a plurality of fairings attached to the rotor plate, each fairing being: (a) disposed adjacent one aperture of the plurality of apertures defined through the rotor plate and (b) configured to improve fluid flow performance through the one aperture.

10. A rotary valve according to claim 9, wherein each fairing of the plurality of fairings is removably attached to the rotor plate via a respective dovetail joint.

11. A rotary valve according to claim 9, wherein each fairing of the plurality of fairings is permanently attached to, or integral with, the rotor plate.

12. A rotary valve according to claim 9, further comprising at least one retaining ring, each retaining ring being parallel and attached to the track plate, with the seal sheet disposed between the retaining ring and the track plate, wherein each fairing of the plurality of fairings is permanently attached to, or integral with, a respective one of the at least one retaining ring.

13. A rotary valve according to claim 1, further comprising a plurality of fairings attached to the track plate, each fairing being: (a) disposed adjacent one aperture of the plurality of apertures defined through the track plate and (b) configured to improve fluid flow performance through the one aperture.

14. A rotary valve according to claim 13, each fairing of the plurality of fairings is removably attached to the track plate via a respective dovetail joint.

15. A rotary valve according to claim 14, wherein each fairing of the plurality of fairings is permanently attached to, or integral with, the track plate.

16. A rotary valve according to claim 14, further comprising at least one retaining ring, each retaining ring being parallel and attached to the rotor plate, with the seal sheet disposed between the retaining ring and the rotor plate, wherein each fairing of the plurality of fairings is permanently attached to, or integral with, a respective one of the at least one retaining ring.

* * * * *